US011859788B2

(12) United States Patent
Toko et al.

(10) Patent No.: US 11,859,788 B2
(45) Date of Patent: Jan. 2, 2024

(54) VEHICLE LIGHTING SYSTEM

(71) Applicant: STANLEY ELECTRIC CO., LTD., Tokyo (JP)

(72) Inventors: Yasuo Toko, Tokyo (JP); Ryotaro Owada, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/761,797

(22) PCT Filed: Sep. 14, 2020

(86) PCT No.: PCT/JP2020/034707
§ 371 (c)(1),
(2) Date: Mar. 18, 2022

(87) PCT Pub. No.: WO2021/054283
PCT Pub. Date: Mar. 25, 2021

(65) Prior Publication Data
US 2022/0341559 A1 Oct. 27, 2022

(30) Foreign Application Priority Data
Sep. 20, 2019 (JP) ................. 2019-171083

(51) Int. Cl.
F21S 41/64 (2018.01)
F21S 41/25 (2018.01)
(Continued)

(52) U.S. Cl.
CPC .......... F21S 41/645 (2018.01); B60Q 1/1423 (2013.01); F21S 41/25 (2018.01); F21W 2107/10 (2018.01)

(58) Field of Classification Search
CPC ........ F21S 41/645; F21S 41/25; F21S 41/145; F21S 41/365; F21S 41/135; B60Q 1/1423;
(Continued)

(56) References Cited

U.S. PATENT DOCUMENTS

| 2003/0063232 A1 | 4/2003 | Hirota et al. |
| 2007/0014196 A1 | 1/2007 | Furuya et al. |
| 2012/0314180 A1 | 12/2012 | Hashimoto et al. |
| 2019/0195457 A1 | 6/2019 | Toko et al. |
| 2019/0226656 A1 | 7/2019 | Toko et al. |

FOREIGN PATENT DOCUMENTS

| EP | 3501896 A1 | 6/2019 |
| JP | 2003107530 A | 4/2003 |

(Continued)

OTHER PUBLICATIONS

International Search Report (ISR) (and English language translation thereof) dated Nov. 10, 2020, issued in International Application No. PCT/JP2020/034707.
(Continued)

Primary Examiner — Elmito Breval
(74) Attorney, Agent, or Firm — Holtz, Holtz & Volek PC

(57) ABSTRACT

To reduce uneven brightness of light irradiated from a vehicle lighting system. The system includes a lamp unit and a control unit where the lamp unit includes: a light source that emits light; a liquid crystal element using the light emitted from the light source to form irradiation light; and a lens projecting the irradiation light; where the light from the light source enters the element at an angle including a direction inclined from the normal of a light incident surface of the element; where the light incident surface has a first region in which most light enters from a viewing direction of the element and a second region in which most light enters from other directions, and where the control unit drives the element by setting a first voltage of the first region (Continued)

to be low and setting a second voltage of the second region to be high.

8 Claims, 12 Drawing Sheets

(51) Int. Cl.
 *B60Q 1/14* (2006.01)
 *F21W 107/10* (2018.01)

(58) Field of Classification Search
 CPC .. F21W 2107/10; F21W 2102/10; G02F 1/13; F21Y 2115/10
 See application file for complete search history.

(56) References Cited

FOREIGN PATENT DOCUMENTS

| | | |
|---|---|---|
| JP | 2005183327 A | 7/2005 |
| JP | 2007026512 A | 2/2007 |
| JP | 2013001234 A | 1/2013 |
| JP | 2019128449 A | 8/2019 |
| WO | 2011105619 A1 | 9/2011 |

OTHER PUBLICATIONS

Written Opinion dated Nov. 10, 2020, issued in International Application No. PCT/JP2020/034707.
Extended European Search Report (EESR) dated Sep. 13, 2023, issued in counterpart European Application No. 20864722.2.

Fig. 8A

| GRADATION | VOLTAGE [V] | REGION R1 TRANSMITTANCE [%] (REVERSE VIEWING DIRECTION) | VOLTAGE [V] | REGION R2 TRANSMITTANCE [%] (NORMAL DIRECTION) | VOLTAGE [V] | REGION R3 TRANSMITTANCE [%] (VIEWING DIRECTION) |
|---|---|---|---|---|---|---|
| 0 | 0.0 | 0.78291 | 0.0 | 0.06257 | 0.0 | 1.34910 |
| 1 | 0.0 | 2.71940 | 2.9 | 2.90000 | 2.4 | 3.05280 |
| 2 | 3.2 | 6.23740 | 3.1 | 5.80000 | 2.6 | 5.66780 |
| 3 | 3.6 | 10.66300 | 3.4 | 12.10400 | 2.8 | 11.04200 |
| 4 | 4.0 | 17.03700 | 3.6 | 16.14100 | 3.0 | 17.32400 |
| 5 | 5.4 | 22.58100 | 4.0 | 22.62400 | 3.2 | 22.85900 |
| 6 | 6.2 | 26.04200 | 4.4 | 26.85900 | 3.4 | 26.94500 |
| 7 | 7.8 | 29.54300 | 4.8 | 29.31800 | 3.6 | 29.68400 |
| 8 | 10.0 | 31.36600 | 10.0 | 32.81100 | 10.0 | 32.01200 |

VEHICLE LIGHTING SYSTEM

TECHNICAL FIELD

The present invention relates to a system for irradiating the periphery of a vehicle (front, etc.) with light in a desired pattern, for example.

BACKGROUND ART

Japanese Unexamined Patent Application Publication No. 2005-183327 (Patent Document 1) discloses a vehicle headlamp configured to change the shape of alight distribution pattern, the vehicle headlamp including a light emitting unit composed of at least one LED and an optical shielding unit which cuts off a part of light irradiated to the front from the light emitting unit and forms a cut-off suitable for the light distribution pattern of the vehicle headlamp, where the optical shielding unit is configured by an electro-optic element equipped with a light control function and a control unit to light control the electro-optic element. The control unit carries out electrical switching control of the electro-optic element to selectively control the light control portion, thereby changing the shape of the light distribution pattern. As the electro-optical element, for example, a liquid crystal element is used.

Here, when the front of a vehicle is irradiated by the vehicle headlamp using a liquid crystal element as described above, usually, lights emitted by a pair of the headlamps are superimposed to form an irradiation light. However, since many liquid crystal elements have a viewing direction (best viewing direction) defined by the alignment direction of the liquid crystal molecules, there may be a difference in the brightness of the irradiation light between the best viewing direction and other directions. Such a difference in brightness is perceived as light unevenness which is caused by uneven brightness and spread of the light irradiated to the front of the vehicle. In particular, when an attempt is made to carry out gradation control of the irradiation light, the above phenomenon becomes more prominent.

PRIOR ART DOCUMENT

Patent Document

Patent Document 1: Japanese Unexamined Patent Application Publication No. 2005-183327

SUMMARY OF THE INVENTION

In a specific aspect, it is an object of the present invention to provide a technique capable of reducing uneven brightness of the light irradiated from a vehicle lighting system using a liquid crystal element.

(1) A vehicle lighting system according to one aspect of the present invention is a vehicle lighting system including (a) a lamp unit disposed in a front section of a vehicle, and (b) a control unit that controls the operation of the lamp unit, (c) where the lamp unit has (c1) a light source that is controlled by the control unit and emits light; (c2) a liquid crystal element that is controlled by the control unit and uses the light emitted from the light source to form irradiation light; and (c3) a lens that projects the periphery of the vehicle the irradiation light formed by the liquid crystal element; (d) where the light emitted from the light source is made incident to the liquid crystal element at a wide angle including a component in a direction inclined from the normal of a light incident surface of the liquid crystal element, (e) where the light incident surface has at least a first region in which a relatively large amount of the light is incident from a direction along a viewing direction of the liquid crystal element and a second region in which a relatively large amount of the light is incident from a direction not along the viewing direction of the liquid crystal element; and (f) where the control unit drives the liquid crystal element by setting a first voltage of the first region to be relatively low and setting a second voltage of the second region to be relatively high.

(2) A vehicle lighting system according to one aspect of the present invention is a vehicle lighting system including (a) a first lamp unit and a second lamp unit disposed in a front section of a vehicle, and (b) a control unit that controls the operation of the first lamp unit and the second lamp unit, (c) where the first lamp unit and the second lamp unit each has (c1) a light source that is controlled by the control unit and emits light; (c2) a liquid crystal element that is controlled by the control unit and uses the light emitted from the light source to form irradiation light; and (c3) a lens that projects the periphery of the vehicle the irradiation light formed by the liquid crystal element; (d) where the light from the light source is made incident to the liquid crystal element at a wide angle including a component in a direction inclined from the normal of a light incident surface of the liquid crystal element, (e) where the light incident surface has at least a first region in which a relatively large amount of the light is incident from a direction along a viewing direction of the liquid crystal element and a second region in which a relatively large amount of the light is incident from a direction not along the viewing direction of the liquid crystal element, (f) where, in each of the first a lamp unit and the second a lamp unit, the control unit drives the liquid crystal element by setting a first voltage of the first region to be relatively low and setting a second voltage of the second region to be relatively high, and (g) where the viewing direction of the liquid crystal element of the first lamp unit and the viewing direction of the liquid crystal element of the second lamp unit are arranged so as to have a line-symmetrical or point-symmetrical relationship with each other.

(3) A vehicle lighting system according to one aspect of the present invention is a vehicle lighting system including (a) a lamp unit disposed in a front section of a vehicle, and (b) a control unit that controls the operation of the lamp unit, (c) where the lamp unit has (c1) a light source that is controlled by the control unit and emits light; (c2) a liquid crystal element that is controlled by the control unit and uses the light emitted from the light source to form irradiation light; and (c3) a lens that projects the periphery of the vehicle the irradiation light formed by the liquid crystal element; (d) where the light emitted from the light source is made incident to the liquid crystal element at a wide angle including a component in a direction inclined from the normal of a light incident surface of the liquid crystal element, (e) where the light incident surface has at least a first region in which a relatively large amount of the light is incident from a direction along a viewing direction of the liquid crystal element and a second region in which a relatively large amount of the light is incident from a direction not along the viewing direction of the liquid crystal element, (f) where the light source has a first unit that emits a relatively large amount of the light incident to the first region and a second unit that emits a relatively large amount of the light incident to the second region, and (g) where the control unit drives the light source by setting the brightness of the light emitted from the first unit to be relatively low and setting the brightness of the light emitted from the second unit to be relatively high.

(4) A vehicle lighting system according to one aspect of the present invention is a vehicle lighting system including (a) a first lamp unit and a second lamp unit disposed in a front section of a vehicle, and (b) a control unit that controls the operation of the first lamp unit and the second lamp unit, (c) where the first lamp unit and the second lamp unit each has (c1) a light source that is controlled by the control unit and emits light; (c2) a liquid crystal element that is controlled by the control unit and uses the light emitted from the light source to form irradiation light; and (c3) a lens that projects the periphery of the vehicle the irradiation light formed by the liquid crystal element; (d) where the light from the light source is made incident to the liquid crystal element at a wide angle including a component in a direction inclined from the normal of a light incident surface of the liquid crystal element, (e) where the light incident surface has at least a first region in which a relatively large amount of the light is incident from a direction along a viewing direction of the liquid crystal element and a second region in which a relatively large amount of the light is incident from a direction not along the viewing direction of the liquid crystal element, (f) where the light source has a first unit that emits a relatively large amount of the light incident to the first region and a second unit that emits a relatively large amount of the light incident to the second region, (g) where the control unit drives the light source by setting the brightness of the light emitted from the first unit to be relatively low and setting the brightness of the light emitted from the second unit to be relatively high, and (h) where the viewing direction of the liquid crystal element of the first lamp unit and the viewing direction of the liquid crystal element of the second lamp unit are arranged so as to have a line-symmetrical or a point-symmetrical relationship with each other.

According to the above configurations, it is possible to reduce uneven brightness of the light irradiated from a vehicle lighting system using a liquid crystal element.

BRIEF DESCRIPTION OF THE DRAWINGS

FIG. 8A is a diagram showing an example of the relationship between the voltage from the drive unit and the transmittance of each region.

MODE FOR CARRYING OUT THE INVENTION

Figure 1:
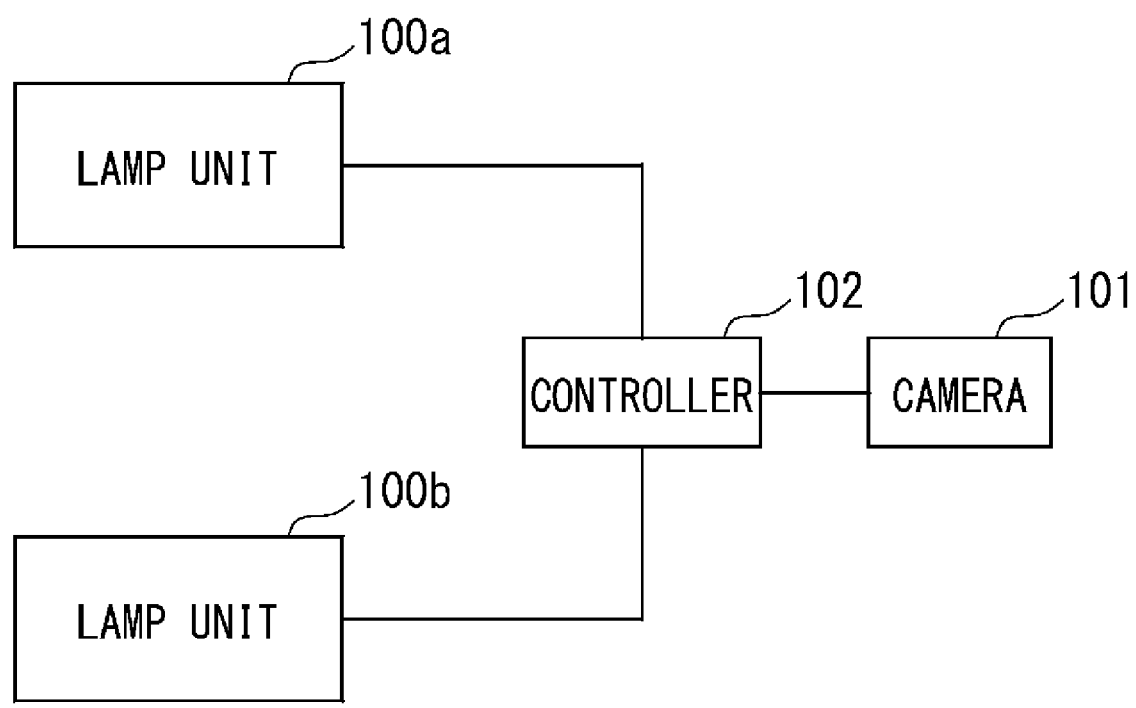
FIG. 1 is a diagram showing a configuration of a vehicle lighting system according to one embodiment.

FIG. 1 is a diagram showing a configuration of a vehicle lighting system according to one embodiment. The vehicle lighting system shown in FIG. 1 is configured to include a pair of lamp units (vehicle headlamps) 100a and 100b, a camera 101, and a controller 102. The vehicle headlight system detects the position of a front vehicle, face of a pedestrian, etc. existing around an own vehicle based on the image taken by the camera 101, sets a certain region including the position of the front vehicle and the like as a non-irradiated region (dimming region), and sets the other region as an irradiated region and performs selective light irradiation.

The lamp units 100a and 100b are arranged at predetermined positions on the left and right sides of the front of the vehicle, and form irradiation light for illuminating the front of the vehicle. In the vehicle lighting system of the present embodiment, the irradiation lights of the lamp units 100a and 100b are superimposed in front of the vehicle to form an irradiation light.

The camera 101 captures the front of the own vehicle and outputs the image (information) thereof, and is arranged at a predetermined position in the vehicle (for example, the upper part inside the windshield). Here, if the vehicle is equipped with a camera for other purposes (for example, an automatic braking system), the camera may be shared.

The controller 102 is for controlling the operation of each lamp unit 100a and 100b. In detail, the controller 102 detects the position of the vehicle in front or the like by performing image processing based on the image obtained by the camera 101, sets a light distribution pattern in which the detected position of the vehicle in front, etc. is set as a non-irradiated region and the other region is set as an irradiated region, generates a control signal in order to form an image corresponding to the light distribution pattern, and supplies the control signal to the drive unit 9 (refer to FIG. 2 to be described later) provided in each of the lamp units 100a, 100b. The controller 102 is realized by executing a predetermined operation program in a computer system having, for example, a CPU, a ROM, a RAM, or the like. Here, the controller 102 and the drive unit 9 correspond to the "control unit".

Figure 2:
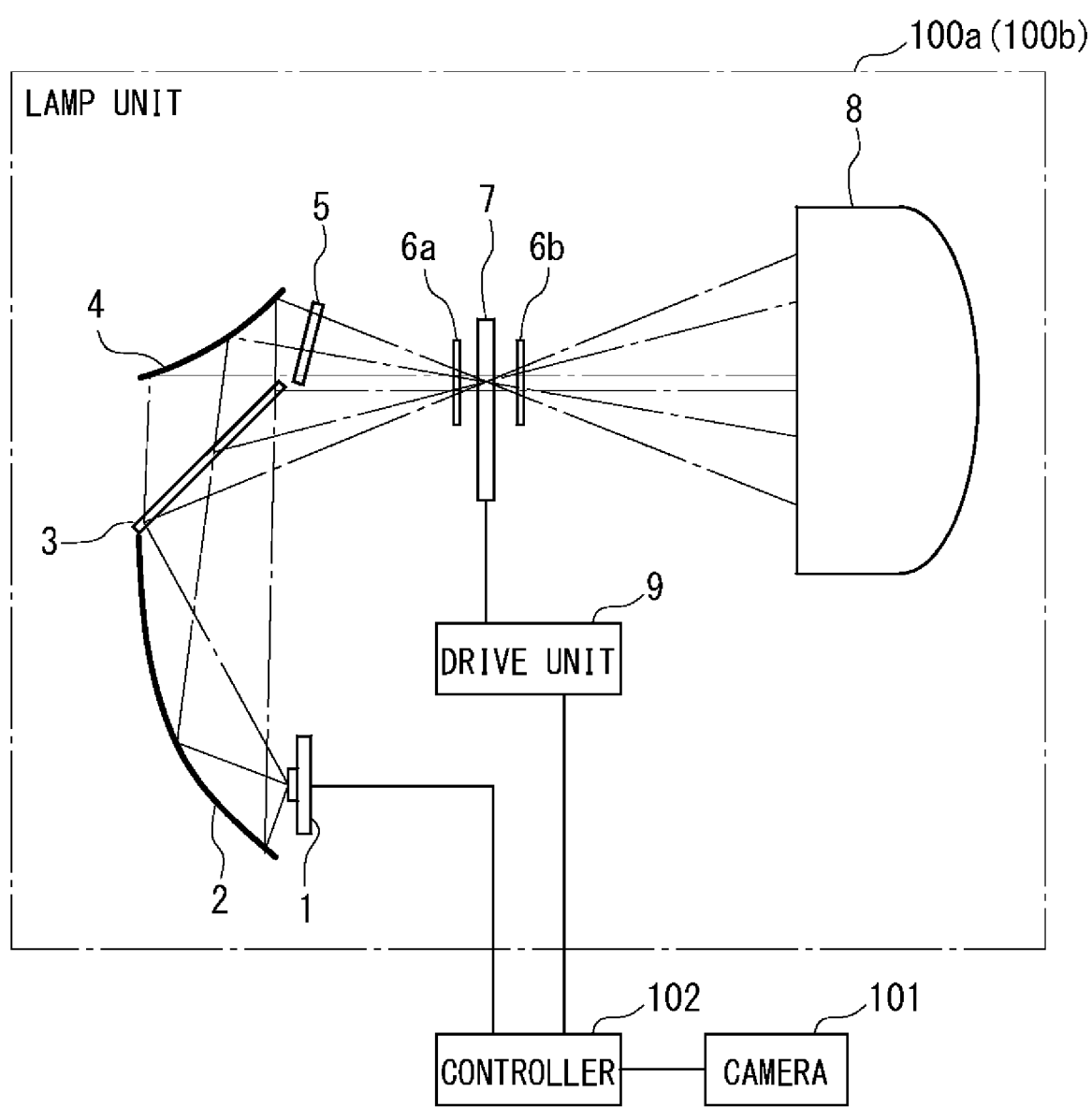
FIG. 2 is a diagram showing a configuration of the lamp unit.

FIG. 2 is a diagram showing the configuration of the lamp unit. Here, since the lamp unit 100a and 100b have the same configuration, only the lamp unit 100a will be described here. The lamp unit 100a is configured to include a light source 1, a concave reflector 2, a polarized beam splitter 3, a reflector 4, a ½ wave plate (λ/2 plate) 5, a pair of polarizers 6a, 6b, a liquid crystal element 7, a projection lens 8, and a drive unit 9.

The light source 1 is configured to include, for example, a white LED configured by combining a light emitting diode (LED) that emits blue light with a yellow phosphor. The light source 1 includes, for example, a plurality of white LEDs arranged in a matrix or a line. Here, as the light source 1, other than LEDs, lasers, or light sources commonly used in a lamp unit for vehicles such as light bulbs and discharge lamps can be used. The light on-off state of the light source 1 is controlled by the controller 102. The light emitted from the light source 1 is made incident to the liquid crystal element (liquid crystal panel) 7 via an optical system which includes the concave reflector 2, the polarized beam splitter 3, and the reflector 4. Here, another optical system (for example, a lens, a reflecting mirror, or a combination thereof) may exist on the path from the light source 1 to the liquid crystal element 7.

The concave reflector (reflecting member) 2 reflects the light incident from the light source 1 and makes it incident to the polarized beam splitter 3.

The polarized beam splitter (optical branching element) separates the incident light reflected by the concave reflector 2 into two polarized lights. One of the polarized light separated by the polarized beam splitter 3 is reflected by the polarized beam splitter 3 and is made incident to the polarizer 6a. Further, the other polarized light separated by the polarized beam splitter 3 passes through the polarized beam splitter 3 and is made incident to the reflector 4. The polarized beam splitter 3 is arranged at an angle of about 45° with respect to the traveling direction of the light from the concave reflector 2. In order to carry out polarization separation, it is desirable that the polarization direction of the polarized beam splitter 3 is set to either a vertical direction or a horizontal direction. In this case, the polarization direction of the light incident to the liquid crystal element 7 becomes either a vertical direction or a horizontal direction.

The reflector (reflecting member) 4 reflects the light transmitted through the polarized beam splitter 3 (polarized light) and causes it to enter the ½ wave plate 5.

The ½ wave plate 5 rotates the polarization direction of the incident light (polarized light) reflected by the reflector 4 by 90°, and is made incident to the polarizer 6a.

The pair of polarizers 6a and 6b have their polarization axes substantially orthogonal to each other, for example, and are arranged so as to face each other with the liquid crystal element 7 interposed therebetween. In the present embodiment, a normally black mode, which is an operation mode in which light is shielded (transmittance becomes extremely low) when no voltage is applied to the liquid crystal layer, is assumed. As each of the polarizers 6a and 6b, an absorption-type polarizer made of a general organic material (iodine-based or dye-based) can be used, for example. Further, when heat resistance is desired, it is also preferable to use a wire grid type polarizer. A wire grid type polarizer is a polarizer made by arranging ultrafine wires made of a metal such as aluminum. Further, the absorption-type polarizer and the wire grid type polarizer may be stacked and used.

The liquid crystal element 7 has, for example, a plurality of pixel regions (optical modulation regions) which can be individually controlled, and the transmittance of each pixel region is variably set in accordance with the magnitude of the voltage applied to the liquid crystal layer supplied by the drive unit 9. By irradiating the liquid crystal element 7 with light, an image having brightness corresponding to the above-described irradiated region and non-irradiated region is formed. In the present embodiment, two polarized lights which are the polarized light reflected by the polarized beam splitter 3 (to be incident) and the polarized light transmitted through the polarized beam splitter 3 and reflected by the reflector 4 (to be incident) are made incident to the liquid crystal element 7 to be used, thereby, the light utilization efficiency is high.

The above-described liquid crystal element 7 includes, for example, a liquid crystal layer having a substantially vertical alignment, and is arranged between a pair of polarizers 6a and 6b which are in a crossed Nicol arrangement. And when no voltage (or a voltage below a threshold value) is applied to the liquid crystal layer, the light transmittance becomes extremely low (light-shielding state), and when a voltage is applied to the liquid crystal layer, the light transmittance becomes relatively high (light-transmitting state).

The projection lens 8 spreads an image (an image having brightness corresponding to the irradiated region and the non-irradiated region) formed by the light transmitted through the liquid crystal element 7 so as to suit headlight light distribution, and projects it to the front of the own vehicle, and an appropriately designed lens is used. In this embodiment, a reverse projection type projector lens is used.

The drive unit 9 individually controls the alignment state of the liquid crystal layer in each pixel region of the liquid crystal element 7 by supplying a drive voltage to the liquid crystal element 7 based on a control signal supplied from the controller 102.

Figure 3:
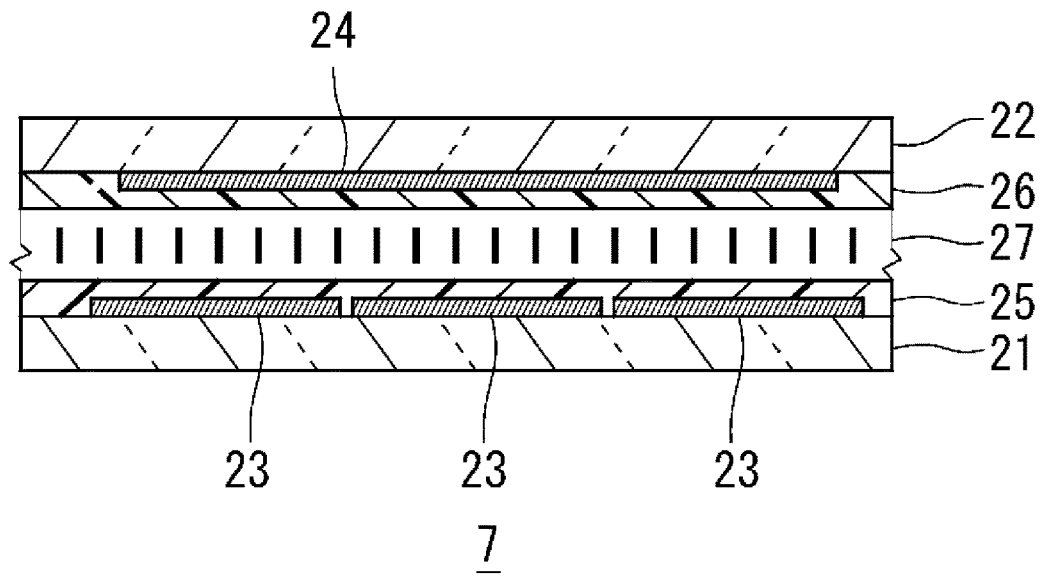
FIG. 3 is a cross-sectional view for explaining the configuration of the liquid crystal element.

FIG. 3 is a cross-sectional view for explaining the configuration of the liquid crystal element. The liquid crystal element 7 shown in FIG. 3 is configured to include a first substrate 21 and a second substrate 22 arranged to face each other, a plurality of pixel electrodes 23 provided on the first substrate 21, a common electrode 24 provided on the second substrate 22, a first alignment film 25 provided on the first substrate 21, a second alignment film 26 provided on the second substrate 22, and a liquid crystal layer 27 arranged between the first substrate 21 and the second substrate 22.

The first substrate 21 and the second substrate 22 are rectangular substrates in a plan view, respectively, and are arranged so as to face each other. As each substrate, for example, a transparent substrate such as a glass substrate or a plastic substrate can be used. A plurality of spherical spacers made of resin are dispersedly arranged between the first substrate 21 and the second substrate 22, for example, and the spacers keep the substrate gap at a desired size (for example, about a few μm). Here, columnar spacers made of resin may be used instead of the spherical spacers.

Each pixel electrode 23 is provided on one surface side of the first substrate 21. Each pixel electrode 23 is configured by appropriately patterning a transparent conductive film such as indium tin oxide (ITO). A pixel region is defined in each of the overlapping regions of each pixel electrode 23 and the common electrode 24.

The common electrode 24 is provided on one surface side of the second substrate 22. The common electrode 24 is provided so as to overlap each pixel electrode 23 in a plan view. The common electrode 24 is configured by appropriately patterning a transparent conductive film such as indium tin oxide (ITO).

The first alignment film 25 is provided so as to cover each pixel electrode 23 on one surface side of the first substrate 21. Further, the second alignment film 26 is provided so as to cover the common electrode 24 on one surface side of the second substrate 22. As each alignment film, a vertical alignment film which regulates the alignment state of the liquid crystal layer 27 to a vertical alignment is used. Each alignment film is subjected to a uniaxial aligning treatment such as a rubbing treatment, and has a uniaxial alignment regulating force that regulates the alignment of the liquid crystal molecules of the liquid crystal layer 27 in that direction. The alignment treatment direction for each alignment film is set to be staggered (anti-parallel), for example.

The liquid crystal layer 27 is interposed between the first substrate 21 and the second substrate 22. In the present embodiment, the liquid crystal layer 27 is configured by using a nematic liquid crystal material having a negative dielectric anisotropy A and having fluidity. The liquid crystal layer 27 of the present embodiment is set so that the alignment direction of the liquid crystal molecules when no voltage is applied is substantially vertically aligned (for example, a pretilt angle of about 89.7°).

Figure 4:
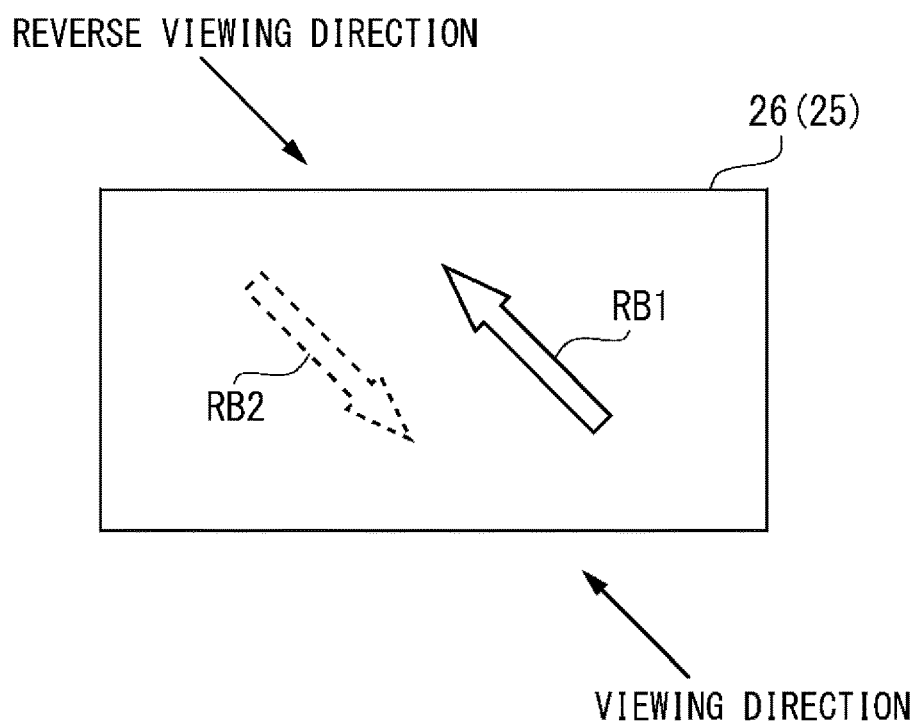
FIG. 4 is a diagram for explaining the relationship between the alignment treatment direction, the viewing direction, and the reverse viewing direction.

FIG. 4 is a diagram for explaining the relationship between the alignment treatment direction, the viewing direction, and the reverse viewing direction. Here, there is schematically shown a state in which each of the alignment treatment directions of the first alignment film 25 and the second alignment film 26 shown in FIG. 3 is viewed from the second substrate 22 side. The alignment treatment direction RB1 of the first alignment film 25 is in the direction toward the upper left in the figure, and the alignment treatment direction RB2 of the second alignment film 26 is in the direction toward the lower right in the figure. That is, the alignment treatment directions RB1 and RB2 are arranged alternately (anti-parallel). In this case, the viewing direction (best viewing direction) becomes the same as the alignment treatment direction RB1 in a plan view, and the reverse viewing direction becomes the opposite direction to the alignment treatment direction RB1 in a plan view.

Figure 5:
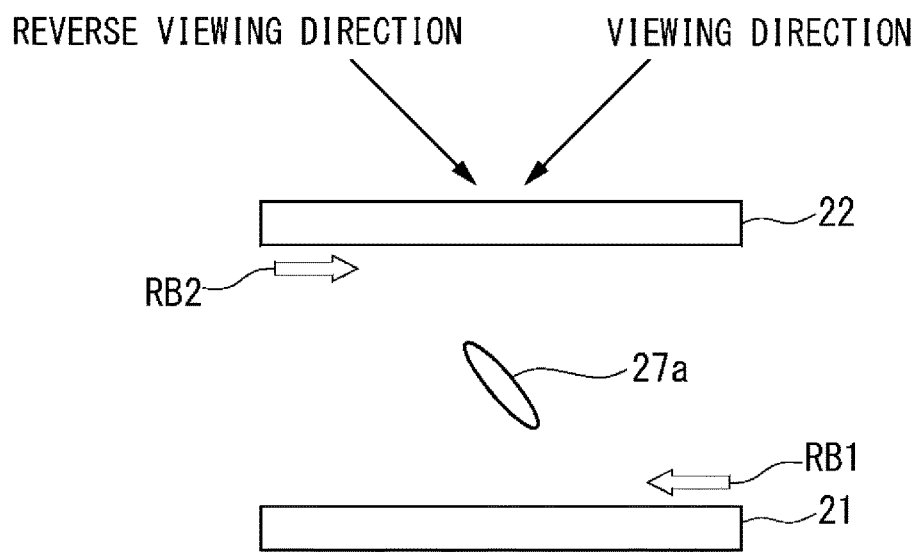
FIG. 5 is a diagram for explaining the relationship between the viewing direction, the reverse viewing direction, and the alignment direction (director direction) of the liquid crystal molecules of the liquid crystal layer.

FIG. 5 is a diagram for explaining the relationship between the viewing direction, the reverse viewing direction, and the alignment direction (director direction) of the liquid crystal molecules of the liquid crystal layer. Here, there is schematically shown a liquid crystal molecule 27a at the substantially center in the layer thickness direction of the liquid crystal layer 27 provided between the first substrate 21 and the second substrate 22. As shown in the figure, the alignment treatment direction RB1 is directed to the left in the figure, and the alignment treatment direction RB2 is directed to the right in the figure. When a voltage which corresponds to intermediate tone is applied to the liquid crystal layer 27, in relation to the alignment treatment directions RB1 and RB2, the liquid crystal molecule 27a at the substantially center in the layer thickness direction of the liquid crystal layer 27 is aligned to rise on the left side in the figure. At this time, the viewing direction becomes opposite to the alignment direction of the liquid crystal molecule 27a, and the reverse viewing direction becomes the same as the viewing direction. Here, the phrase "a voltage which corresponds to intermediate tone" is a voltage between the threshold voltage and the saturation voltage (voltage at which optical changes such as transmittance hardly occurs) of the liquid crystal layer 27.

Figure 6:
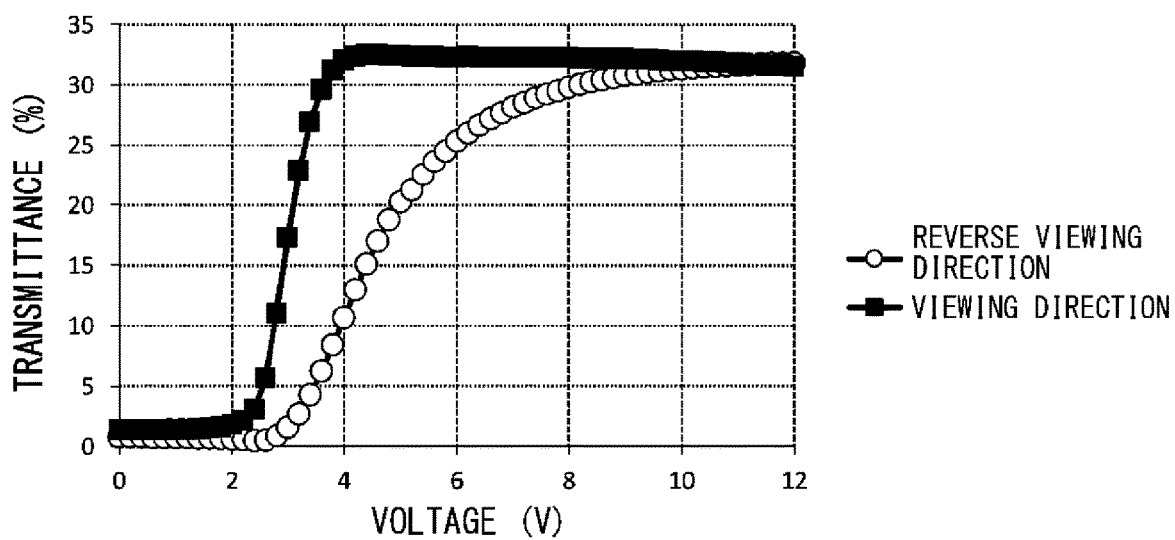
FIG. 6 is a diagram showing an example of transmittance difference between the viewing direction and the reverse viewing direction.

FIG. 6 is a diagram showing an example of transmittance difference between the viewing direction and the reverse viewing direction. Here, there is shown transmittance change in each of the viewing direction and the reverse viewing direction with respect to the voltage applied to the liquid crystal layer 27 in the liquid crystal element 7. In this example, the directions of ±20° with respect to the polar angle direction are defined as the viewing direction and the reverse viewing direction. As shown in the figure, in the liquid crystal element 7, when the same voltage is applied, there is a difference between the transmittance in the viewing direction and the transmittance in the reverse viewing direction. For example, when comparing a case where the voltage is 4 V, the transmittance is about 32% in the viewing direction, whereas the transmittance is about 10% in the reverse viewing direction, and there is a difference of more than 3 times in the transmittance. The transmittance tends to be higher in the viewing direction up to a voltage of about 8 V, and the transmittance is almost the same at a voltage of 10 V. That is, especially when a voltage which corresponds to intermediate tone is applied, the irradiation light formed by the lamp units 100a and 100b causes uneven brightness corresponding to the difference between the viewing direction and the reverse viewing direction. Therefore, in the present embodiment, in each of the liquid crystal elements 7 of the pair of lamp units 100a and 100b, the difference in the transmittance of the irradiation light is suppressed by means such as providing a difference in the drive voltage for each region where the light is incident, thereby reducing uneven brightness in each irradiation light of these lamp units 100a and 100b.

Figure 7A:
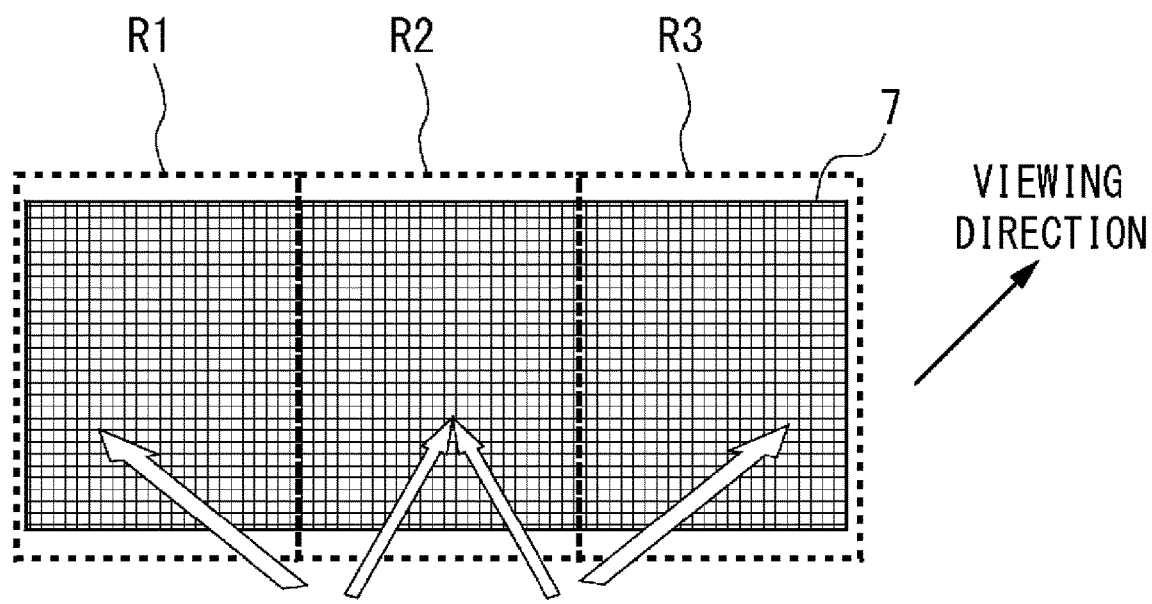
FIG. 7A is a diagram schematically showing a plan view of the light incident surface of the liquid crystal element.
Figure 7B:
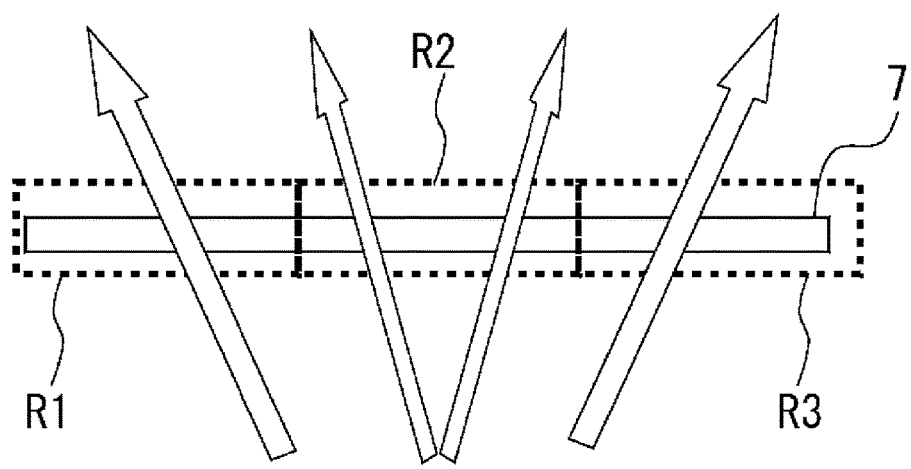
FIG. 7B is a diagram schematically showing a top view of the light incident surface of the liquid crystal element.

FIG. 7A is a diagram schematically showing a plan view of the light incident surface of the liquid crystal element. FIG. 7B is a diagram schematically showing a top view of the light incident surface of the liquid crystal element shown in FIG. 7A. Here, the left-right direction in each figure corresponds to the depth direction of the liquid crystal element 7 shown in FIG. 2. In the vehicle lighting system of the present embodiment, a wide-angle optical system is used in order to increase the brightness (luminous intensity) of the irradiation light, and for example, light is made incident to the light incident surface of the liquid crystal element 7 in a wide range of 20° to 40° in the polar angle direction with reference to the normal direction of the light incident surface. Thus, as the average traveling direction of the incident light is schematically shown in each of FIGS. 7A and 7B, the angle of the incident light with respect to the liquid crystal element 7 differs depending on the position within the light incident surface of the liquid crystal element, and uneven brightness may occur due to the difference. Therefore, in the vehicle lighting system of the present embodiment, the incident surface of the liquid crystal element 7 is divided into a plurality of regions, and different light control is carried out for each region.

Since the angle of the light incident to the light incident surface of the liquid crystal element 7 is different for each region R1, R2, R3, the light transmittance differs in each region R1, R2, R3. Specifically, light is evenly incident to the left and right sides of the region R2, whereas light is incident mainly from the right direction on the region R1 and light is incident mainly from the left direction on the region R3. That is, it can be said that a relatively large amount of light is made incident to the region R3 from the direction along the viewing direction of the liquid crystal element 7, and a relatively large amount of light is made incident to the region R1 from the direction not along the viewing direction of the liquid crystal element 7. Here, the phrase "direction along the viewing direction" is not necessarily limited to being parallel to the viewing direction, but includes a direction which is roughly parallel thereto. Whereas, for example, by setting the voltage supplied from the drive unit 9 to a different magnitude for each region R1, R2, R3, it is possible to reduce the difference in the transmittance of the lights transmitted through each region R1, R2, R3. Here, the region R3 corresponds to "a first region" in the present invention, the region R1 corresponds to "a second region" in the present invention, and the region R2 corresponds to "a third region" in the present invention.

FIG. 8A is a diagram showing an example of the relationship between the voltage from the drive unit and the transmittance of each region. Here, as an example, there is shown the relationship between the voltage and the transmittance of each region in a liquid crystal element that is produced having a layer thickness (cell thickness) of the liquid crystal layer 27 of 4 μm and uses a liquid crystal material having a dielectric anisotropy of about 0.13. In this liquid crystal element, the region R1 corresponds to the reverse viewing direction, the region R2 corresponds to the normal direction, and the region R3 corresponds to the viewing direction. Therefore, for example, when a voltage with the same magnitude as a voltage corresponding to a particular gradation is applied to each pixel region of the liquid crystal layer 27, the general tendency is that the transmittance of the region R3 corresponding to the viewing direction becomes relatively high, and the transmittance of the region R1 corresponding to the reverse viewing direction becomes relatively low.

On the contrary, when a voltage applied to the region R3 corresponding to the viewing direction is set relatively low while a voltage applied to the region R1 corresponding to the reverse viewing direction is set relatively high and a voltage applied to the region R2 is set between these two voltages, the difference in transmittance between the regions R1, R2, and R3 can be reduced. As shown in FIG. 8A, for example, in a case where gradation level is "3", by applying a voltage of 3.6 V to the region R1, a voltage of 3.4 V to the region 2, and a voltage of 2.8 V to the region R3, the difference in transmittance between each region can be made extremely small. The same applies to other gradations. The numerical values given here is merely an example, and since specific numerical values differ depending on the characteristics of the liquid crystal element 7 and the characteristics of the optical system, etc., suitable values may be determined by experiments or simulations.

Figure 8B:
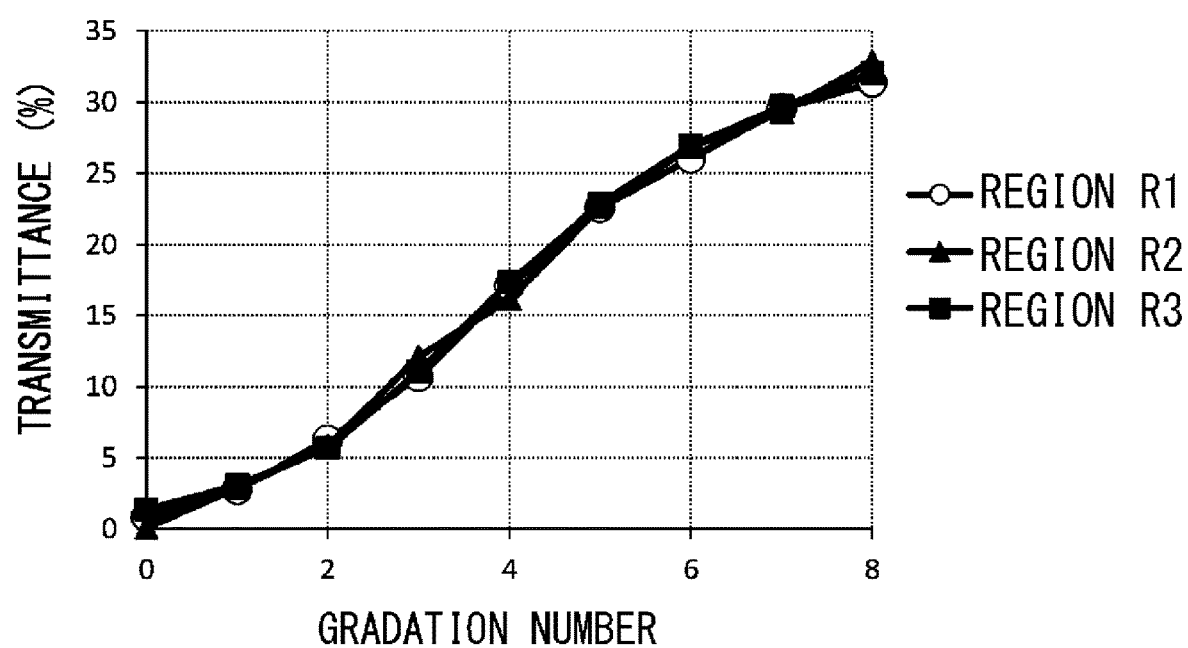
FIG. 8B is a diagram showing the transmittance at each gradation level in each region shown in FIG. 8A.

FIG. 8B is a diagram showing the transmittance at each gradation level in each region shown in FIG. 8A. As shown in the figure, it can be seen that the difference in transmittance can be extremely reduced at every gradation level by setting the voltage for each region in accordance with the viewing direction. Thereby, the brightness of the light irradiated from each lamp unit 100a and 100b can be made uniform.

As a different method from the above, for example, by setting the brightness of the light emitted from the light source 1 to be different for each region R1, R2, R3, the difference in the brightness of the light transmitted through each region R1, R2, R3 can be reduced. Hereinafter, this method will be described.

Figure 9A:
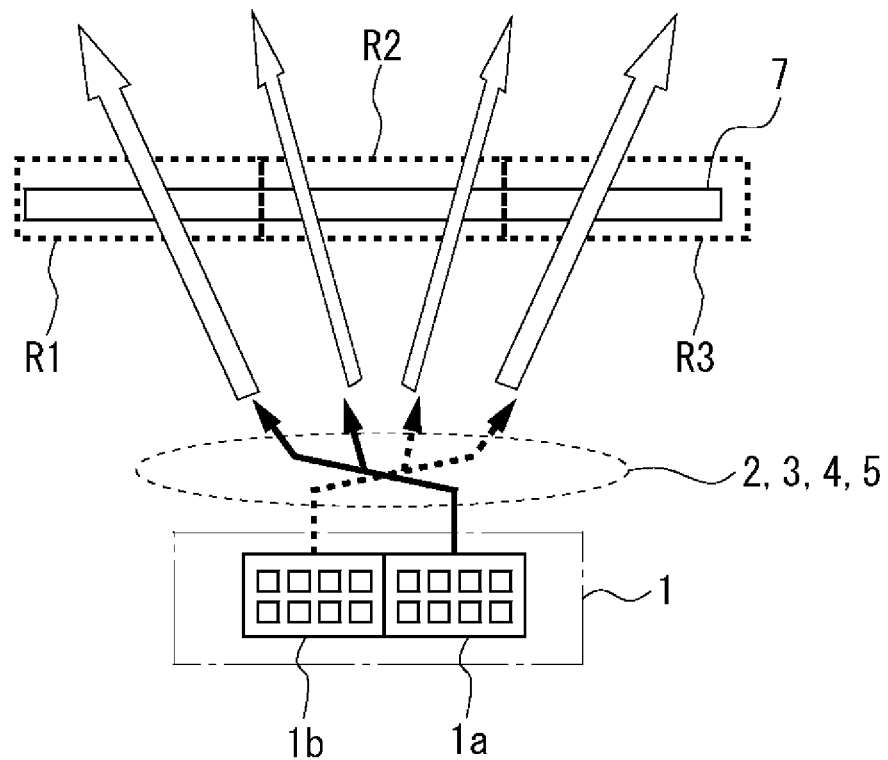
FIG. 9A is a diagram schematically showing the relationship between a light incident surface of the liquid crystal element, a light source, and an optical system.

FIG. 9A is a diagram schematically showing the relationship between a light incident surface of the liquid crystal element, a light source, and an optical system. Similar to FIG. 7B described above, a top view of the light incident surface of the liquid crystal element 7 is shown, and the left-right direction in the figure corresponds to the depth direction of the liquid crystal element 7 shown in FIG. 2. Here, in order to make light incident to the light incident surface of the liquid crystal element 7 in a wide angle range of, for example, 20° to 40°, a light source 1 having a light emitting element unit 1a (a first unit) and a light emitting element unit 1b (a second unit), which are two independently controllable light emitting element units, is exemplified. Further, the lights emitted from the light emitting element units 1a and 1b of the light source 1 are made incident to the liquid crystal element 7 via an optical system including a concave reflector 2, a polarized beam splitter 3, a reflector 4, and a ½ wave plate 5. And it is assumed that the light emitted from the light emitting element unit 1a is made incident mainly to the regions R1 and R2, and the light emitted from the light emitting element unit 1b is made incident mainly to the regions R2 and R3.

Figure 9B:
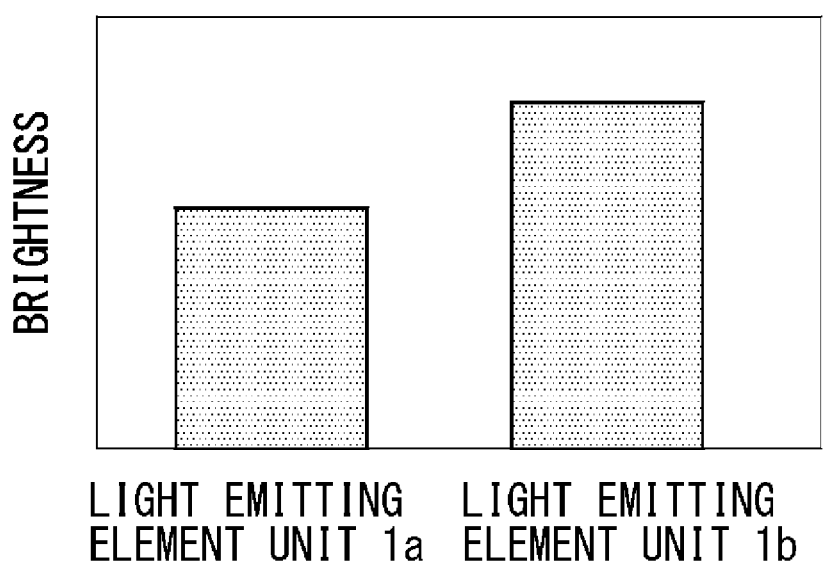
FIG. 9B is a diagram showing the difference in the brightness of the light emitted from each light emitting element unit.

FIG. 9B is a diagram showing the difference in the brightness of the light emitted from each light emitting element unit. Here, the term "brightness" is luminance, for example. Further, it is assumed that, as the voltage associated with each gradation level, the voltage with the same magnitude is applied to each pixel region of the liquid crystal layer 27. In this case, if the brightness of the lights emitted from each of the light emitting element units 1a and 1b are the same, the general tendency is that the light transmitted through the region R3 which corresponds to the viewing direction becomes relatively bright, and the light transmitted through the region R1 which corresponds to the reverse viewing direction becomes relatively dark. Whereas, by individually carrying out the gradation control of the drive voltage for each of the light emitting element units 1a and 1b by the controller 102, the brightness of the light incident to each of the regions R1 and R3 can be made substantially uniform. In the illustrated example, by setting the brightness of the light emitted from the light emitting element unit 1a relatively low and setting the brightness of the light emitted from the light emitting element unit 1b relatively high, the difference in the light transmitted from the region R1 and the region R3 can be reduced, and the brightness of the light irradiated from the lamp units 100a and 100b can be made uniform.

Here, with regard to the brightness control of the light emitted from the light emitting element units 1a and 1b, instead of carrying out variable control of the drive voltage, of the plurality of light emitting elements included in each light emitting element unit 1a and 1b, the number of light emitting elements to be emitted may be set variably. For example, by carrying out a control to set the number of light emitting elements to be emitted to three for the light emitting element unit 1a, and to set the number of light emitting elements to be emitted to four for the light emitting element unit 1b, the brightness of the emitted lights can be variably controlled.

Figure 10:
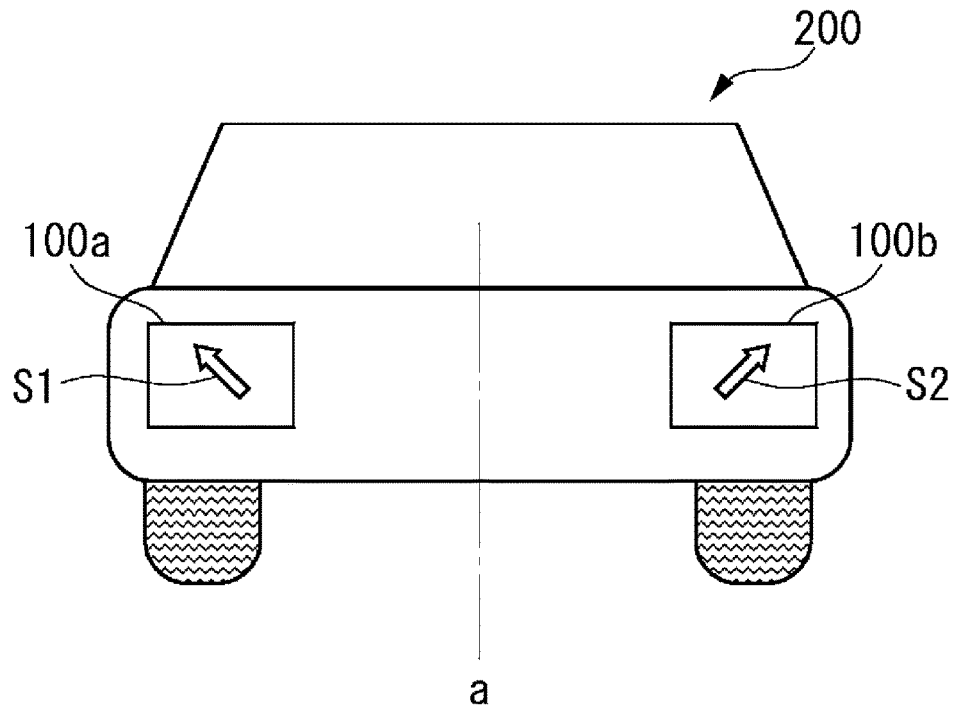
FIG. 10 is a diagram for explaining the arrangement state of a pair of lamp units.

FIG. 10 is a diagram for explaining the arrangement state of a pair of lamp units. Here, a front part of a vehicle 200 is schematically shown. In the front part of the vehicle 200, a lamp unit 100a is installed on the left side in the figure (the front right side of the vehicle 200), and a lamp unit 100b is installed on the right side in the figure (the front left side of the vehicle 200). The lamp units 100a and 100b are arranged at positions 0.7 meters away from their respective intermediate position a. As shown in the figure, the lamp unit 100a is installed so that the viewing direction S1 is in the upper left 45° direction with respect to the vehicle width direction in the figure. Further, the lamp unit 100b is installed so that the viewing direction S2 is in the upper right 45° direction with respect to the vehicle width direction in the figure. In other words, each of the viewing directions S1 and S2 are arranged so as to extend outward in the vehicle width direction of the vehicle 200. Here, note that each of the viewing directions S1 and S2 may be arranged so as to extend inward in the vehicle width direction of the vehicle 200. The viewing directions S1 and S2 referred to here are directions that are viewed in a plan view from the second substrate 22 side of the liquid crystal element 7 (refer to FIG. 4). In this way, the pair of lamp units 100a and 100b are arranged so that the viewing directions S1 and S2 have a line-symmetrical relationship with the intermediate position a interposed therebetween. As a result, since uneven brightness of the light irradiated from each of the lamp units 100a and 100b can be offset, uneven brightness of the light emitted by superimposing each irradiation light can be further reduced.

Here, as a way to arrange the viewing directions S1 and S2 of the lamp units 100a and 100b in line symmetry, for example, there is a way such that, when manufacturing each liquid crystal element 7, the alignment treatment directions RB1 and RB2 are set in accordance with the respective viewing directions S1 and S2. Further, there may also be a way such that, when manufacturing each liquid crystal element 7, viewing from the second substrate 22 side, the viewing directions S1 and S2 are set so that they are aligned in the same direction, and the second substrate 22 side is set to face the light emitting side with respect to one liquid crystal element 7, and the first substrate 21 side is set to face the light emitting side with respect to the other liquid crystal element 7.

Figure 11:
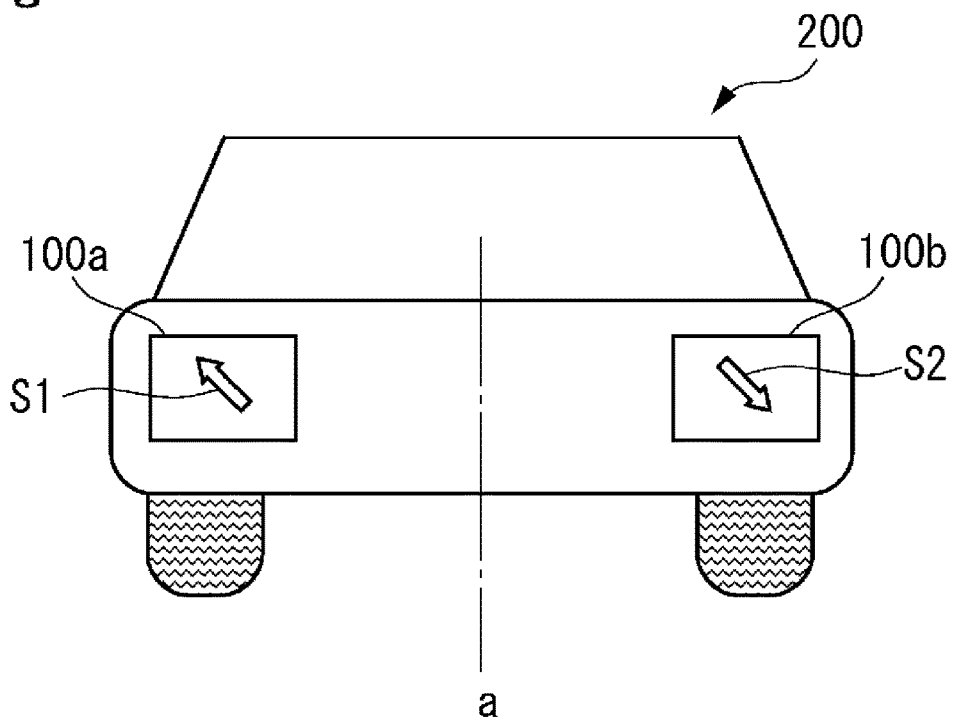
FIG. 11 is a diagram for explaining an arrangement state of a pair of lamp units in a vehicle lighting system of a modified example.

Further, in the embodiment shown in FIG. 10, the pair of lamp units 100a and 100b are arranged so that the viewing directions S1 and S2 have a line-symmetrical relationship with the intermediate position a interposed therebetween, but as illustrated in FIG. 11, a similar outcome can be obtained when the viewing directions S1 and S2 are arranged so as to have a point-symmetrical relationship. In a modified example shown in FIG. 11, in the vehicle 200, the viewing direction S1 of the lamp unit 100a is set in the upper left direction, and the viewing direction S2 of the lamp unit 100b is set in the lower right direction.

Figure 12:
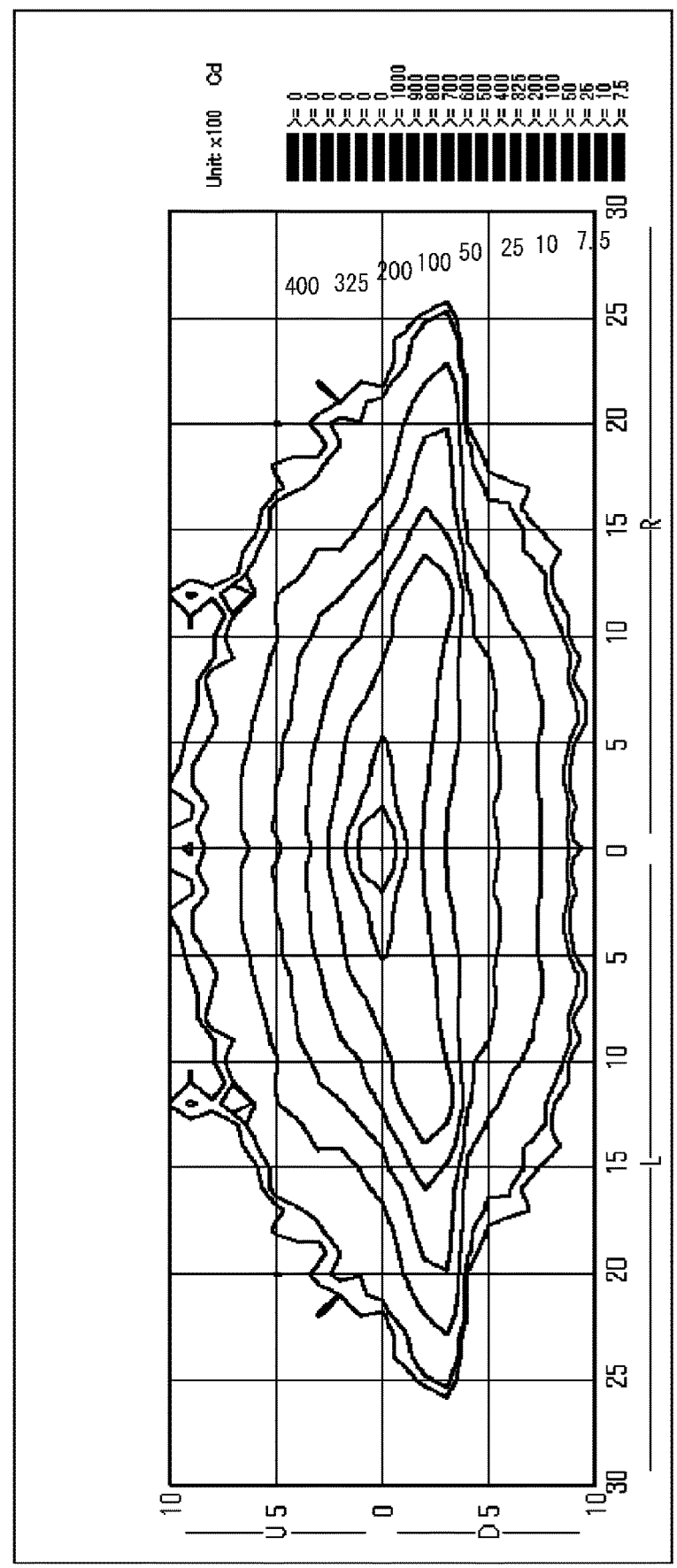
FIG. 12 is a diagram showing an example of the luminosity distribution of irradiation light formed by superimposing irradiation lights emitted from each lamp unit.

FIG. 12 is a diagram showing an example of the luminosity distribution of irradiation light formed by superimposing irradiation lights emitted from each lamp unit. The luminous intensity distribution displayed on a screen which is disposed 10 meters in front of the vehicle is illustrated in the figure, and the light irradiated from each of the lamp units 100a and 100b is formed by applying a voltage such that an intermediate tone of about ⅓ of the maximum luminous intensity is achieved. As shown in the illustrated example, by arranging the viewing directions S1 and S2 of the lamp units 100a and 100b so that they have a line-symmetrical relationship with the intermediate position a interposed therebetween, it can be seen that, in a wide range of about ±25° in the horizontal direction and about ±10° in the vertical direction, irradiation light having light intensity distribution with less uneven brightness is obtained.

According to the above embodiments, it is possible to reduce uneven brightness of the light irradiated from the vehicle lighting system using a liquid crystal element.

Figure 13:
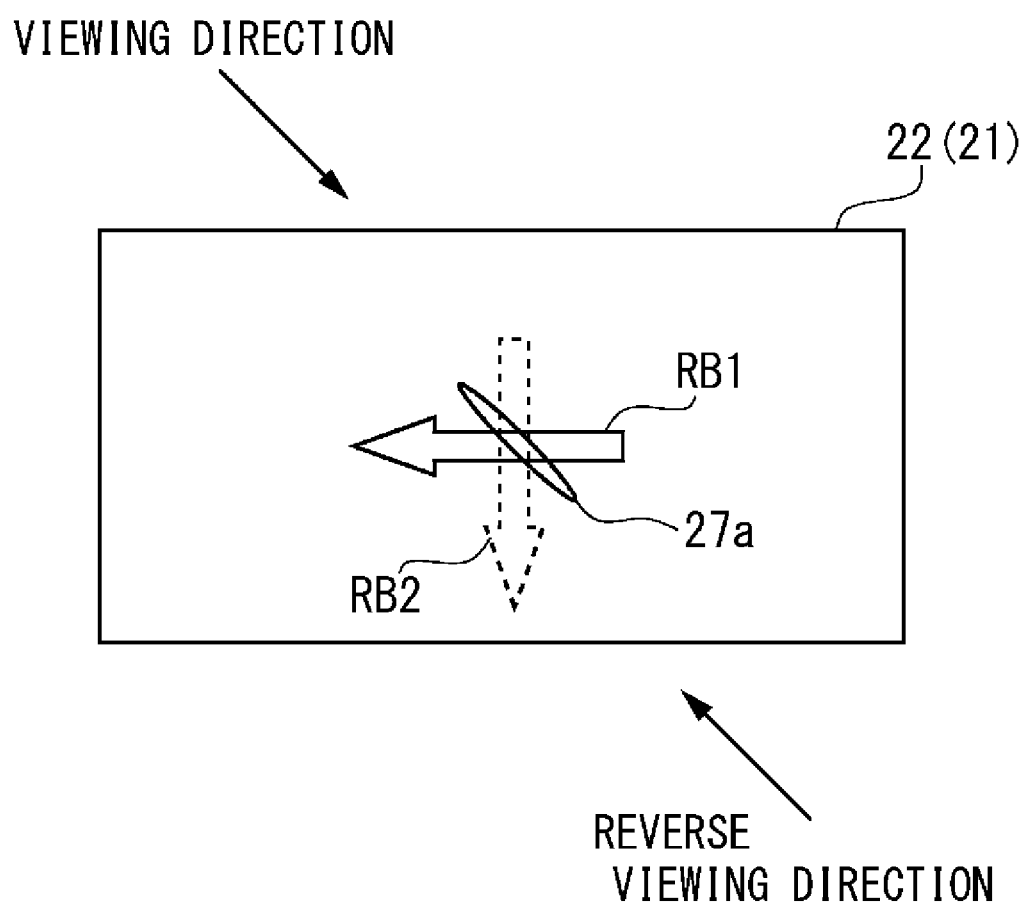
FIG. 13 is a diagram for explaining the relationship between the alignment treatment direction, the viewing direction, and the reverse viewing direction of the liquid crystal element of a modified example.

The present invention is not limited to the contents of the above-described embodiments, and can be variously modified and implemented within the scope of the gist of the present invention. For example, in the above-described embodiments, as an example of the liquid crystal element, the liquid crystal layer is set to be substantially vertically aligned, but the alignment mode of the liquid crystal layer is not limited thereto. Regardless of the alignment mode of the liquid crystal layer, the arrangement of a pair of lamp units may be set in accordance with the viewing direction and the reverse viewing direction. For example, as shown in FIG. 13, in a case where the alignment treatment directions RB1 and RB2 which corresponds to the first alignment film 25 and the second alignment film 26 are orthogonal to each other, and the alignment mode of the liquid crystal layer 27 is set to a TN (twisted nematic) type, the alignment direction of the liquid crystal molecules 27a at the substantially center in the layer thickness direction of the liquid crystal layer 27 becomes 45° with respect to the alignment treatment directions RB1 and RB2 in a plan view, as shown in the figure. In this case, since the viewing direction (best viewing direction) becomes the direction toward the lower right in the figure, and the reverse viewing direction becomes the direction toward the upper left in the figure, based on these, the arrangement of the pair of lamp units 100a and 100b may be set in the same manner as in the above-described embodiments (refer to FIGS. 10 and 11).

Figure 14:
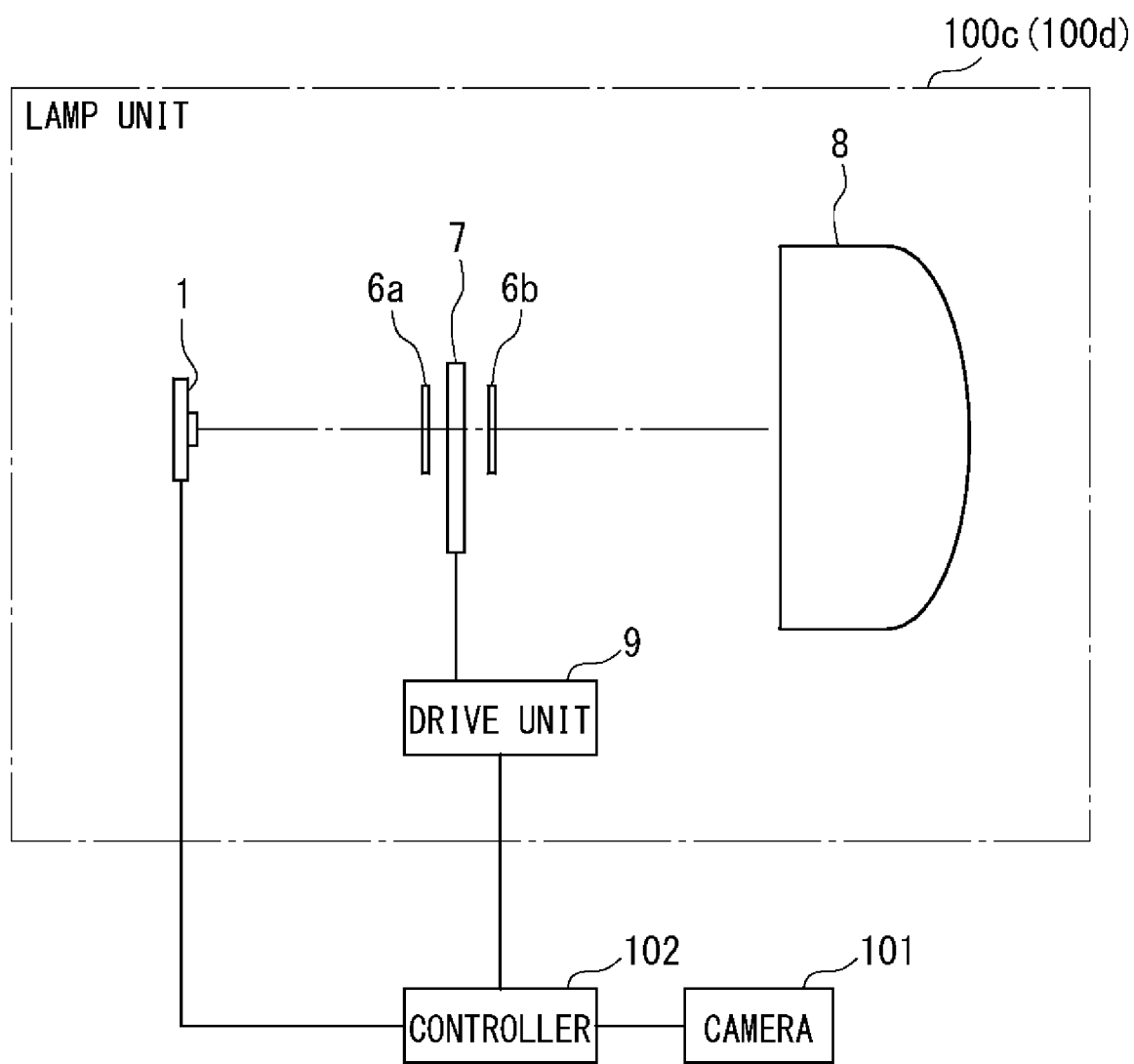
FIG. 14 is a diagram showing a configuration of a lamp unit of a modified example.

Further, in the above-described embodiments, a lamp unit has been exemplified where it adopts a so-called recycled optical system in which all of the polarized lights separated by the polarized beam splitter are used, but the configuration of the lamp unit is not limited thereto. For example, as illustrated in FIG. 14, a pair of lamp units 100c, 100d with a relatively simple configuration where light from a light source 1 is directly incident to a liquid crystal element 7 arranged between a pair of polarizing 6a and 6b, and the transmitted light is collected and projected by a projection lens 8, may be used.

Further, in the above-described embodiments, cases where the present invention is applied to a vehicle headlight system which irradiates light to the front of the vehicle has been described, but present invention can also be applied to a system where light is irradiated to the periphery other than the front of the vehicle.

DESCRIPTION OF REFERENCE NUMERALS

1: Light source
1a, 1b: Light emitting element unit (of light source)
2: Concave reflector
3: Polarized beam splitter
4: Reflector
5: ½ wave plate (λ/2 plate)
6a, 6b: Pair of polarizers
7: Liquid crystal element
8: Projection lens
9: Drive unit
21: First substrate
22: Second substrate
23: Pixel electrode
24: Common electrode
25: First alignment film
26: Second alignment film
27: Liquid crystal layer
27a: Liquid crystal molecule
RB1, RB2: Alignment treatment direction
S1, S2: Viewing direction
100a, 100b: Lamp unit (vehicle headlamp)
101: Camera
102: Controller
R1, R2, R3: Region

The invention claimed is:

1. A vehicle lighting system comprising:
a lamp unit disposed in a front section of a vehicle; and
a control unit that controls the operation of the lamp unit;
wherein the lamp unit comprises:
a light source that is controlled by the control unit and emits light;
a liquid crystal element that is controlled by the control unit and uses the light emitted from the light source to form irradiation light; and
a lens that projects a periphery of the vehicle the irradiation light formed by the liquid crystal element;

wherein the light emitted from the light source is made incident to the liquid crystal element at a wide angle including a component in a direction inclined from the normal of a light incident surface of the liquid crystal element;

wherein the light incident surface has at least a first region and a second region, the first region receives more light incident from a direction along a viewing direction of the liquid crystal element than light incident from a direction not along the viewing direction of the liquid crystal element, and the second region receives more of the light incident from the direction not along the viewing direction of the liquid crystal element than the light incident from the direction along the viewing direction of the liquid crystal element; and wherein the control unit drives the liquid crystal element by setting a first voltage of the first region and a second voltage of the second region such that the first voltage is lower than the second voltage.

2. The vehicle lighting system according to claim 1, wherein the light incident surface further has a third region arranged between the first region and the second region; and wherein the control unit drives the liquid crystal element by setting a third voltage of the third region to a magnitude between the first voltage and the second voltage.

3. The vehicle lighting system according to claim 2, wherein the first voltage, the second voltage, and the third voltage are voltages that set the irradiation light to an intermediate tone.

4. A vehicle lighting system comprising:

a first lamp unit and a second lamp unit disposed in a front section of a vehicle, and a control unit that controls the operation of the first lamp unit and the second lamp unit, wherein each of the first lamp unit and the second lamp unit comprises:

a light source that is controlled by the control unit and emits light;

a liquid crystal element that is controlled by the control unit and uses the light emitted from the light source to form irradiation light; and a lens that projects a periphery of the vehicle the irradiation light formed by the liquid crystal element;

wherein the light from the light source is made incident to the liquid crystal element at a wide angle including a component in a direction inclined from the normal of a light incident surface of the liquid crystal element;

wherein the light incident surface has at least a first region and a second region, the first region receives more light incident from a direction along a viewing direction of the liquid crystal element than light incident from a direction not along the viewing direction of the liquid crystal element, and the second region receives more of the light incident from the direction not along the viewing direction of the liquid crystal element than the light incident from the direction along the viewing direction of the liquid crystal element;

wherein, in each of the first a lamp unit and the second a lamp unit, the control unit drives the liquid crystal element by setting a first voltage of the first region and a second voltage of the second region such that the first voltage is lower than the second voltage; and wherein the viewing direction of the liquid crystal element of the first lamp unit and the viewing direction of the liquid crystal element of the second lamp unit are arranged so as to have a line-symmetrical or point-symmetrical relationship with each other.

5. A vehicle lighting system comprising:

a lamp unit disposed in a front section of a vehicle, and a control unit that controls the operation of the lamp unit, wherein the lamp unit comprises:

a light source that is controlled by the control unit and emits light;

a liquid crystal element that is controlled by the control unit and uses the light emitted from the light source to form irradiation light; and a lens that projects a periphery of the vehicle the irradiation light formed by the liquid crystal element;

wherein the light emitted from the light source is made incident to the liquid crystal element at a wide angle including a component in a direction inclined from the normal of a light incident surface of the liquid crystal element;

wherein the light incident surface has at least a first region and a second region, the first region receives more of the light is incident from a direction along a viewing direction of the liquid crystal element than the second region, and the second region receives more of the light incident from a direction not along the viewing direction of the liquid crystal element than the first region;

wherein the light source comprises a first unit and a second unit that are independently controllable, the first unit emits more of the light incident to the first region than to the second region, and the second unit emits more of the light incident to the second region than to the first region; and wherein the control unit drives the light source by setting a brightness of the light emitted from the first unit and a brightness of the light emitted from the second unit such that the brightness of the light emitted from the first unit is lower than the brightness of the light emitted from the second unit.

6. The vehicle lighting system according to claim 5, wherein the lamp unit is arranged on each of the left and right sides of the front section of the vehicle, and wherein the viewing direction of the liquid crystal element of the lamp unit arranged on the left side of the vehicle and the viewing direction of the liquid crystal element of the lamp unit arranged on the right side of the vehicle are arranged so as to have a line-symmetrical or a point-symmetrical relationship with each other.

7. The vehicle lighting system according to claim 5, wherein the light incident surface further has a third region arranged between the first region and the second region;

wherein the both the light from the first unit and the light from the second unit are incident to the third region; and wherein the control unit drives the liquid crystal element by setting a third voltage of the third region to a magnitude between the first voltage and the second voltage.

8. The vehicle lighting system according to claim 7, wherein the first voltage, the second voltage, and the third voltage are voltages that set the irradiation light to an intermediate tone.

* * * * *